United States Patent

Hoeffel et al.

[15] 3,673,607
[45] June 27, 1972

[54] BILLING DEMAND RECORDER

[72] Inventors: James D. Hoeffel; Reinhold W. Kubach, both of Dayton, Ohio

[73] Assignee: Dayton Electronic Products Company, Dayton, Ohio

[22] Filed: Jan. 20, 1971

[21] Appl. No.: 108,088

[52] U.S. Cl. ..........................346/17, 307/311, 340/253 R, 346/14 MR, 346/74 M, 324/113
[51] Int. Cl. ...................................G01d 13/00, G11b 27/36
[58] Field of Search .................346/17, 14 MR, 33 M, 74 M; 340/174.1 G, 253 R, 253 S, 253 M, 248 R, 248 P, 203; 307/311, 132, 142; 317/7; 324/113

[56] References Cited

UNITED STATES PATENTS

| | | | |
|---|---|---|---|
| 3,125,759 | 3/1964 | Klein et al. ..........................346/74 M |
| 3,148,329 | 9/1964 | Lenehan ...............................324/113 |
| 3,281,692 | 10/1966 | Beroset .............................324/133 X |

OTHER PUBLICATIONS

Instruction Manual For General Electric Type PDM- 70 Pulscript Demand Recorder (GEH- 2780) 3- 69.

*Primary Examiner*—Richard B. Wilkinson
*Assistant Examiner*—J. W. Hartary
*Attorney*—Marechal, Biebel, French & Bugg

[57] ABSTRACT

A recording instrument, such as an electrical power meter, controls the actuation of an electrical switch from one position to another at a rate which is a function of a measured quantity, such as kilowatt hours. The electrical switch controls the direction of current flow through a magnetic recording head so that information representing the measured quantity can be placed on a recording medium. A constant current power supply is provided to insure consistency of information placed on the recording medium independently of line voltage changes, and light emitting diodes are included in series with the magnetic head to show the existence and the direction of current flow through the recording head. Latching flip-flops may also be included between the electrical switch and the recording head to prevent the recording of multiple marks due to switch bounce. Electrically actuated mechanical counters may also be used to record changes in switch position.

7 Claims, 5 Drawing Figures

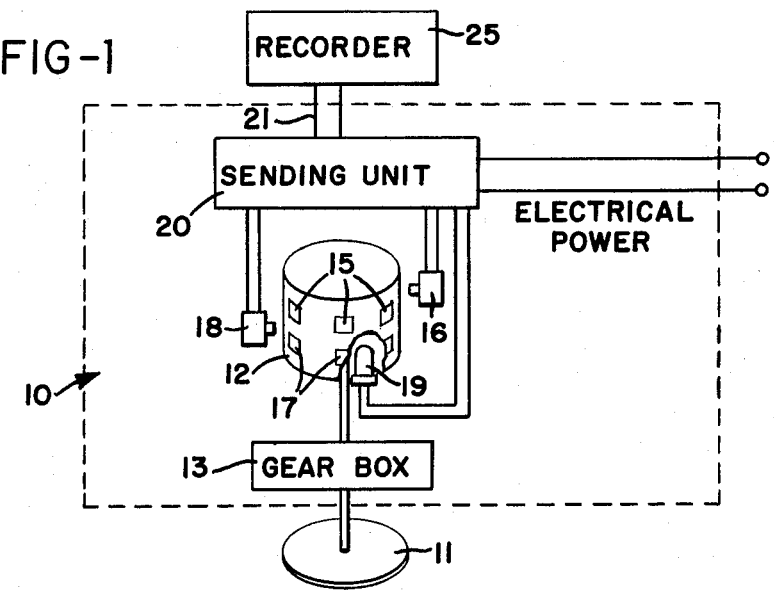
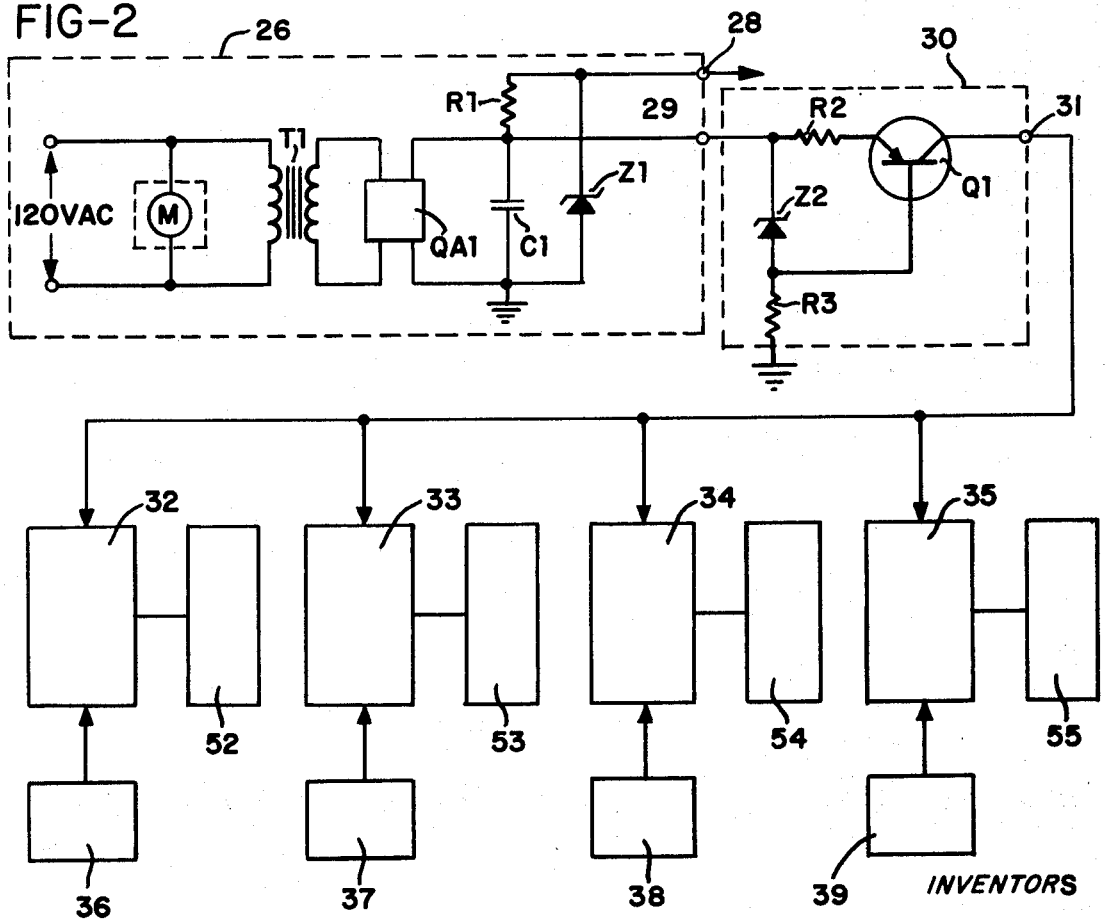
INVENTORS
JAMES D. HOEFFEL &
REINHOLD W. KUBACH
BY Marechal, Biebel, French & Bugg
ATTORNEYS

BILLING DEMAND RECORDER

BACKGROUND OF THE INVENTION

This invention relates to an improved recorder for use with instruments measuring a quantity with respect to time. Such an instrument may measure kilowatt hours, KVA, or current squared, all with respect to some time interval. The measured parameter may be displayed by means of visible dials, and this information may also be placed on a recording medium, such as magnetic tape, as described in U.S. Pat. No. 3,148,329.

Typically, an electrical switch is actuated at a rate determined by the measured quantity, and this switch controls the current through a recording head. Other switches may be employed to control the current through a second recording head to indicate equal intervals of time to provide a reference against which the parameter may be measured.

SUMMARY OF THE INVENTION

This invention relates to an improved recording circuit whereby the existence and direction of current flow through the magnetic recording heads may be determined visually and whereby the recording of multiple magnetic marks due to switch bounce is eliminated.

Specifically, this invention responds to the operation of an electrical switch, commonly called the pulse initiator, which is actuated by a measuring instrument, with the rate at which the switch is actuated from one position to another being determined by the quantity being measured. At least one magnetic recording head is arranged to record on a magnetic tape a magnetic mark, the polarity of which is determined by the position of the switch.

In a typical installation, the electrical switch may be actuated at a slow rate, i.e., less than 1 cycle per minute, and therefore it is often difficult to determine the proper operation of the recording circuit. For this reason, this invention includes a pair of light emitting diodes connected in inverse parallel relation with each other and in series with the recording head. These light emitting diodes permit the visual determination of the existence and direction of current flow at low recording current levels.

The invention contemplates the use of electrically actuated mechanical counters actuated by the electrical switch to record the measured parameter simultaneously with the recording of magnetic marks on the magnetic tape.

This invention also includes the use of latching integrated circuit flip-flops between the electrical switch and the recording head and mechanical counter to prevent multiple pulses from being recorded due to switch bounce thereby insuring the accuracy of the recorded information.

Accordingly, it is an object of this invention to provide an improved recording instrument of the type described which includes light emitting diodes to enable visual determination of the proper operation of the recording instrument including the existence and direction of current flow through the magnetic recording head; to provide an improved recording device of the type described which includes latching flip-flops between the electrical switch and the recording heads to prevent multiple marks from being applied to the recording medium or to prevent multiple actuation of an electrically actuated mechanical counter due to switch bounce; and provide an improved recording device of the type described wherein light emitting diodes indicate the proper functioning and operation of the pulse indicator incorporated in the measuring instrument.

Other objects and advantages of the invention will be apparent from the following description, the accompanying drawings and the appended claims.

BRIEF DESCRIPTION OF THE DRAWINGS

FIG. 1 is a view of a typical measuring instrument including means for actuating an electrical switch at a rate determined by the magnitude of a measured quantity;

FIG. 2 is a block electrical schematic diagram showing the general electrical arrangement of the components comprising this invention;

DESCRIPTION OF THE PREFERRED EMBODIMENT

Figure 3:
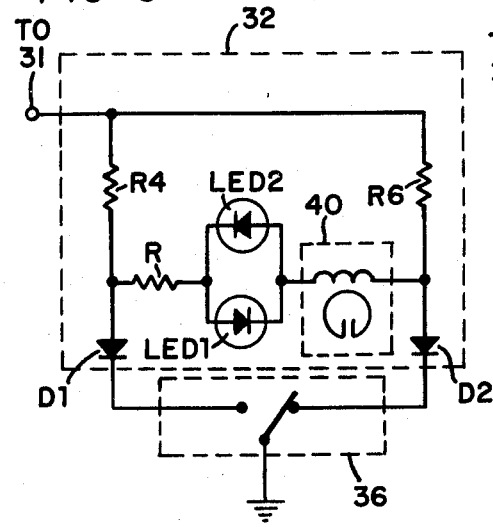
FIG. 3 is an electrical schematic diagram of one of the blocks of FIG. 2, showing light emitting diodes connected in inverse parallel relation with each other and in series with a magnetic recording head.

Referring now to the drawings which show the preferred embodiment of the invention, and particularly to FIG. 1, a measuring instrument 10, such as a watt hour meter, includes a meter disc 11 which rotates at a rate determined by the quantity being measured. The meter disc 11 is connected to a rotating shutter 12 through a gear box 13. The rotating shutter includes a plurality of apertures 15 which are spaced circumferentially and aligned with a photocell 16. A second plurality of apertures 17 are aligned with photocell 18. The light source 19 situated internally of the rotating shutter 12 directs light through the apertures 15 and 17 to the photocells.

The photocells 16 and 18 are connected to a sending unit 20 which, as will be explained, includes a relay having at least one single-pole double-throw switch element. The switch elements are connected by means of a cable 21 to a recorder circuit 25 which includes a magnetic tape. The use of the rotating apertures 15 and the photoelectric cells 16 and 18 permits effective electrical isolation between the measuring instrument 10 and the recorder 25.

FIG. 2 is a block electrical diagram showing one embodiment of the recorder mechanism. The recorder mechanism includes a power supply 26 having a transformer T1 connected to a conventional source of power, a diode bridge module AQ1 connected to the secondary of the transformer, Zener diode Z1, resistor R1 and filter capacitor C1. The power supply has two outputs, a 15 volt output on terminal 28 which is regulated by the Zener diode Z1, and a 20 volt output on terminal 29. The output on terminal 29 is connected to a constant current device 30 which includes Zener Z2, transistor Q1 and resistors R2 and R3. The output of this device on terminal 31 is used to supply a constant current to the recording devices located in the recording circuit shown generally in blocks 32-35. These recording devices are controlled by single-pole double-throw switches 36-39 controlled by the measuring instrument 10.

Switches 36-38 are actuated from one position to another at a rate representing a measured parameter, such as kilowatt hours, current squared, volt amperes, etc., at a rate determined by the rotational velocity of the shutter 12 relative to the photocells 16 and 18. Switch 39 may be controlled by a timer to provide a reference against which the measured parameter can be decoded from the tape.

A tape and drive mechanism, not shown, are provided to record magnetic marks generated by magnetic recording heads in the recording devices 32-35, with these marks usually being placed on the tape simultaneously in separate tracks.

FIG. 3 is a schematic diagram showing one switch 36 connected to recording device 32. Power to the recording circuit is supplied from the constant current source 30 through terminal 31 to a magnetic recording head 40. The single-pole double-throw switch 36 is connected to the recording head through diodes D1 and D2 with the position of the switch determining the direction of current flow through the recording head. Thus, with the switch in the position shown, current will flow through resistors R4 and R5, LED1 the recording head 40, and diode D2 to ground. Current also flows through resistor R6 and diode D2 to ground, although this does not effect recording current. When the switch 36 is in the opposite direction, current through resistor R6 will then flow in the opposite direction through the recording head 40, LED2 resistor R5 and diode D1 to ground. Thus, this invention employs non-return to zero type recording where current flows either in one direction or the other through a recording head.

The existence and the direction of current flowing through the recording head is indicated by a pair of light emitting diodes LED1 and LED2. These are solid state devices which will provide illumination at the low current levels which are used in the recording heads. In the preferred embodiments of this invention, recording currents are maintained at between 2 and 4 milliamperes, and therefore in order to provide an indication of recording current, a device which responds to these low current levels must be used. In the preferred embodiment, light emitting diodes Motorola type MLED600 are used. Thus, current in one direction through the recording head 40 is indicated by the illumination of LED1 while current in the opposite direction is indicated by the illumination of LED2. If neither of these light emitting diodes is illuminated, this indicates a malfunction of the pulse initiator or switch 36.

Figure 4:
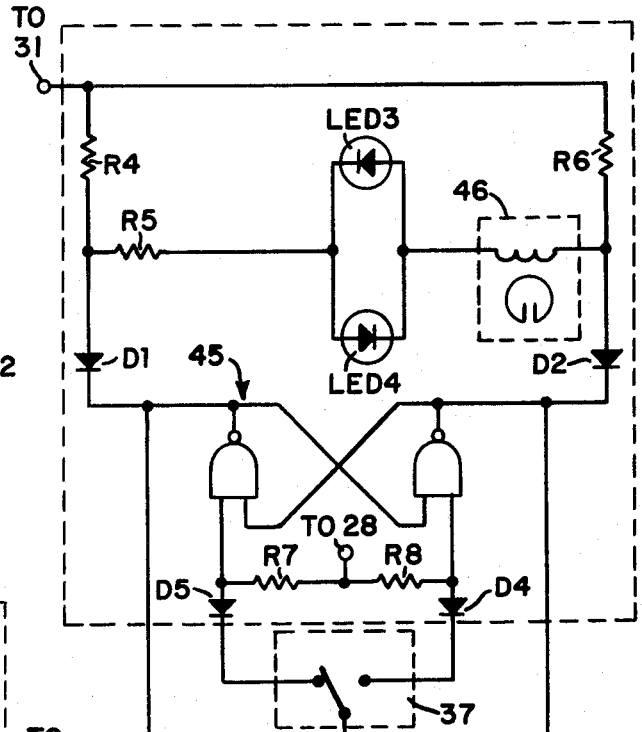
FIG. 4 is an electrical schematic diagram showing another embodiment of the invention.

FIG. 4 represents another embodiment of the invention which also includes light emitting diodes connected in inverse parallel relation with each other and in series with a recording head. In this embodiment, a latching flip-flop circuit 45 is connected between switch 37 and recording head 46. The latching flip-flop is a commercially available device manufactured by Motorola, type MC672P. The latching flip-flop prevents any bounce between the contacts of the switches from being reflected as current changes in the recording head thereby preventing multiple marks from being applied to the recording medium. In this embodiment, light emitting diodes LED3 and LED4 may also be employed to provide a visual indication of the existence and direction of current flow through the recording head.

The recording instrument may also be provided with electrically actuated mechanical counters to record the number of changes in position of the electrical switch. These mechanical recorders 52–55, shown in FIG. 1, may be electrically connected to each of the recording circuits. In FIG. 4, the mechanical recorder is connected to the output of the latching flip-flop circuit and includes a pair of transistors Q2 and Q3 which act as switches to discharge energy stored on capacitors C2 and C3 into the counter solenoid 57. The voltage on capacitors C2 and C3 is determined by Zener diodes Z3 and Z4 and prevent an excessive voltage from being applied across the counter solenoid. Diode D5 provides a current path for the current induced in the solenoid when either transistor Q2 or Q3 is gated off. These Zener diodes limit the energy available to the counter solenoids to prevent jamming. The counter circuit thus counts each change in position of the switch to provide a mechanical back up for the magnetic tape on which is recorded the same information. The mechanical counter is optional and may be used with any of the circuits of this invention.

Figure 5:
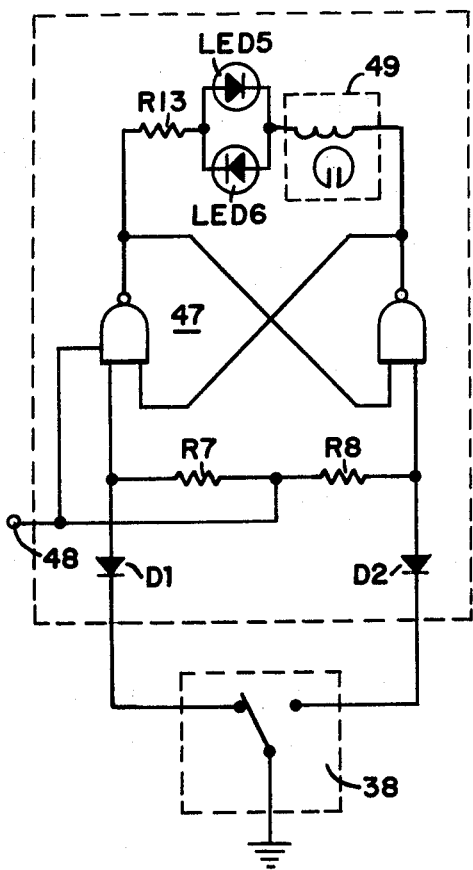
FIG. 5 is an electrical schematic diagram showing still another embodiment of the invention.

FIG. 5 shows still another embodiment of the invention utilizing a latching flip-flop circuit 47 controlled by switch 38, however in this embodiment, a constant voltage source is used to supply power to the latching flip-flop at terminal 48 and the flip-flop circuit itself supplies current to light emitting diodes LED5 and LED6 and magnetic recording head 49. This circuit eliminates some of the components used in the circuits of FIGS. 3 and 4, and employs both the light emitting diodes to provide visual indication of the existence and direction of current flow through the recording head and a latching flip-flop to prevent the recording of multiple marks on a magnetic medium due to switch bounce.

This invention therefore is an improved recording device for use with billing recording instruments which allows the visual determination of recording currents of low magnitude, i.e., 2 to 4 milliamperes, and which insures accurate recording of the number of changes in switch position both by magnetic and electromechanical means by preventing any switch bounce from creating multiple actuating signals.

Typical values of the components described in the specification and drawings are as follows:

| | | | |
|---|---|---|---|
| R1 | 100 | C1 | 500 f |
| R2 | 470 | C2 | 260 f |
| R3 | 3.3K | C3 | 260 f |
| R4 | 4.7K | D1-D5 | IN4005 |
| R5 | 220 | Z1 | IN5352A |
| R6 | 4.7K | Z2-Z4 | IN5242 |
| R7 | 2.2K | Q1-Q3 | 2N5366 |
| R8 | 2.2K | LED1-LED6 | Motorola Type MLED600 |
| R9 | 1K | QA1 | VARO Type VE-27 |
| R10 | 1K | | |
| R11 | 1K | | |
| R12 | 1K | | |
| R13 | 3.3K | | |

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a recording instrument including:
   an electrical switch which can assume one of two positions;
   means for actuating said electrical switch between said positions at a rate which is a function of a measured quantity;
   at least one magnetic recording head for applying magnetic marks to a recording medium under the control of said electrical switch; and
   means for supplying current to said magnetic recording head in a direction determined by the position of said electrical switch;
   the improvement comprising:
      a pair of light emitting diodes connected in inverse parallel relation with each other and in series with each said magnetic recording head for indicating the existence of and the direction of current flow through said recording head.

2. The recording instrument of claim 1 further including
   flip-flop means electrically connected between said electrical switch and said recording head for preventing multiple marks from being applied by said recording head to the recording medium due to switch bounce.

3. The recording instrument of claim 1 wherein a plurality of switches are provided to measure a corresponding plurality of measured quantities, wherein a plurality of magnetic recording heads are provided to apply magnetic marks to said recording medium, and wherein each of said switches is connected to a corresponding flip-flop to control recording current through corresponding said recording heads.

4. The recording instrument of claim 1 further including means for counting the changes in position of said switch means independently of the recording of magnetic marks on said recording medium.

5. In a recording instrument including
   an electrical switch which can assume one of two positions;
   means for actuating said electrical switch between said positions at a rate which is a function of a measured quantity;
   at least one magnetic recording head for applying magnetic marks to a recording medium under the control of said electrical switch; and
   means for supplying current to said magnetic recording head in a direction determined by the position of said electrical switch;
   the improvement comprising
      flip-flop means electrically connected between said electrical switch and said recording head for preventing multiple magnetic marks from being applied by said recording head to the recording medium due to switch bounce.

6. The recording instrument of claim 5 wherein said means for supplying current is a constant current source.

7. The recording instrument of claim 5 further including electro-mechanical means connected to said flip-flop means to record said changes in switch position simultaneously with the recording of magnetic marks on said recording medium.

* * * * *